US011192482B2

(12) United States Patent
Jiang et al.

(10) Patent No.: US 11,192,482 B2
(45) Date of Patent: Dec. 7, 2021

(54) HEADREST ASSEMBLY INCLUDING LOCKING ARRANGEMENT REDUCING BSR

(71) Applicant: Daimay North America Automotive, Inc., Redford, MI (US)

(72) Inventors: Yintai Jiang, Shanghai (CN); Jianhua Wang, Novi, MI (US); Guojun Tang, Zhoushan (CN)

(73) Assignee: Daimay North America Automotive, Inc., Redford, MI (US)

( * ) Notice: Subject to any disclaimer, the term of this patent is extended or adjusted under 35 U.S.C. 154(b) by 0 days.

(21) Appl. No.: 17/040,598

(22) PCT Filed: Aug. 6, 2018

(86) PCT No.: PCT/CN2018/098990
§ 371 (c)(1),
(2) Date: Sep. 23, 2020

(87) PCT Pub. No.: WO2020/029016
PCT Pub. Date: Feb. 13, 2020

(65) Prior Publication Data
US 2021/0039536 A1    Feb. 11, 2021

(51) Int. Cl.
*B60N 2/818*    (2018.01)
*B60N 2/815*    (2018.01)

(52) U.S. Cl.
CPC ............. *B60N 2/818* (2018.02); *B60N 2/815* (2018.02)

(58) Field of Classification Search
CPC .................................. B60N 2/818; B60N 2/815
See application file for complete search history.

(56) References Cited

U.S. PATENT DOCUMENTS 3,498,672 A * 3/1970 Ludwig ................. B60N 2/818
                                                  297/410
3,512,832 A * 5/1970 Motokuni ............. B60N 2/818
                                                  297/410
(Continued)

FOREIGN PATENT DOCUMENTS

CN        102700442 A    10/2012
CN        204136826 U     2/2015
(Continued)

OTHER PUBLICATIONS

International Search Report and Written Opinion for International Application No. PCT/CN2018/098990 dated Apr. 22, 2019.

*Primary Examiner* — David R Dunn
*Assistant Examiner* — Tania Abraham
(74) *Attorney, Agent, or Firm* — Carlson, Gaskey & Olds, P.C.

(57)    ABSTRACT

This disclosure generally relates to a headrest assembly for a seat in a vehicle. In particular, the headrest assembly includes a locking arrangement that reduces, if not completely eliminates, buzz, squeak, and rattle (BSR). An exemplary headrest assembly includes, among other things, a rod including a recess and which is configured to connect the headrest assembly to a seat back. The headrest assembly also includes a head restraint having a locking portion configured to selectively engage the recess to set a vertical position of the head restraint relative to the rod. Further, at least one of the recess and the locking portion is tapered. Tapering the recess and/or the locking portion ensures that there will be two opposed points of contact between the recess and the locking portion, thereby reducing, if not eliminating, BSR between the two elements.

15 Claims, 3 Drawing Sheets

(56) References Cited

U.S. PATENT DOCUMENTS

| | | | | |
|---|---|---|---|---|
| 3,512,833 | A | * | 5/1970 | Koichi ................... B60N 2/818 |
| | | | | 297/410 |
| 4,679,850 | A | * | 7/1987 | Bianchi ................. B60N 2/818 |
| | | | | 297/410 |
| 7,044,555 | B2 | | 5/2006 | Saberan |
| 7,517,009 | B2 | | 4/2009 | Mauro et al. |
| 7,845,721 | B2 | * | 12/2010 | Maeda ................... B60N 2/844 |
| | | | | 297/216.12 |
| 8,182,037 | B2 | | 5/2012 | Jeong et al. |
| 2014/0145489 | A1 | | 5/2014 | Wang et al. |

FOREIGN PATENT DOCUMENTS

| | | |
|---|---|---|
| CN | 204564414 U | 8/2015 |
| CN | 105102264 A | 11/2015 |
| WO | 2013081404 A1 | 6/2013 |

\* cited by examiner

HEADREST ASSEMBLY INCLUDING LOCKING ARRANGEMENT REDUCING BSR

TECHNICAL FIELD

This disclosure relates to a headrest assembly for a seat in a vehicle. In particular, the headrest assembly includes a locking arrangement that reduces buzz, squeak, and rattle (BSR).

BACKGROUND

Headrests are configured to be positioned relative to the back of an occupant's head and neck. Known headrests can be vertically adjusted by raising and lowering a head restraint to accommodate occupants of different heights.

Some known headrest assemblies include a rod having two vertical portions, and further include dedicated locks relative to each vertical portion. In order to adjust the position of the headrest, an occupant is required to activate both locks simultaneously, which requires use of both of the occupant's hands.

SUMMARY

A headrest assembly according to an exemplary aspect of the present disclosure includes, among other things, a rod configured to connect the headrest assembly to a seat back. The rod also includes a recess. The headrest assembly further includes a head restraint having a locking portion configured to selectively engage the recess to set a vertical position of the head restraint. Further, at least one of the recess and the locking portion is tapered.

In a further non-limiting embodiment of the foregoing headrest assembly, both the recess and the locking portion are tapered.

In a further non-limiting embodiment of any of the foregoing headrest assemblies, the recess is tapered such that a dimension of the recess is reduced moving away from the outside of the rod.

In a further non-limiting embodiment of any of the foregoing headrest assemblies, the locking portion is a plate tapered such a dimension of the plate is reduced moving toward the recess.

In a further non-limiting embodiment of any of the foregoing headrest assemblies, the taper of the recess is greater than a taper of the locking portion.

In a further non-limiting embodiment of any of the foregoing headrest assemblies, when the locking portion is within the recess, there are two points of contact between the locking portion and the rod.

In a further non-limiting embodiment of any of the foregoing headrest assemblies, when the locking portion is within the recess, the locking portion is spaced-apart from an end of the recess.

In a further non-limiting embodiment of any of the foregoing headrest assemblies, opposed surfaces of the locking portion are in contact with opposed surfaces of the recess.

In a further non-limiting embodiment of any of the foregoing headrest assemblies, the rod includes first and second vertical sections, each of the first and second vertical sections includes a plurality of recesses, the locking portion is a first locking portion configured to selectively engage the recesses of the first vertical section, and the head restraint includes a second locking portion configured selectively engage the recesses of the second vertical section.

In a further non-limiting embodiment of any of the foregoing headrest assemblies, the head restraint includes a pushing plate, and the locking portion is moveable with the pushing plate.

In a further non-limiting embodiment of any of the foregoing headrest assemblies, the locking portion is provided by a metal plate mounted to the pushing plate.

In a further non-limiting embodiment of any of the foregoing headrest assemblies, the head restraint includes a push button configured to move the pushing plate when depressed.

In a further non-limiting embodiment of any of the foregoing headrest assemblies, the pushing plate is moveable between an engaged position and a disengaged position by the push button.

In a further non-limiting embodiment of any of the foregoing headrest assemblies, the head restraint includes a biasing member biasing the locking portion toward the recess.

In a further non-limiting embodiment of any of the foregoing headrest assemblies, the head restraint includes a first cover and a second cover, and the first cover and the second cover support a cushion and an encasement.

A seat for a motor vehicle according to an exemplary aspect of the present disclosure includes, among other things, a seat back and a headrest assembly. The headrest assembly has a rod configured to connect the headrest assembly to a seat back, the rod including a recess. The headrest assembly further has a head restraint with a locking portion configured to selectively engaging the recess to set a vertical position of the head restraint. Further, at least one of the recess and the locking portion is tapered.

In a further non-limiting embodiment of the foregoing seat, the recess is tapered such that a dimension of the recess is reduced moving away from the outside of the rod, and the locking portion is a plate tapered such a dimension of the plate is reduced moving toward the recess.

In a further non-limiting embodiment of any of the foregoing seats, the taper of the recess is greater than a taper of the locking portion.

In a further non-limiting embodiment of any of the foregoing seats, when the locking portion is within the recess, there are two points of contact between the locking portion and the rod and the locking portion is spaced-apart from an end of the recess.

In a further non-limiting embodiment of any of the foregoing seats, opposed surfaces of the locking portion are in contact with opposed surfaces of the recess.

DETAILED DESCRIPTION

This disclosure generally relates to a headrest assembly for a seat in a vehicle. In particular, the headrest assembly includes a locking arrangement that reduces, if not completely eliminates, buzz, squeak, and rattle (BSR). An exemplary headrest assembly includes, among other things, a rod including a recess and which is configured to connect the headrest assembly to a seat back. The headrest assembly also includes a head restraint having a locking portion configured to selectively engage the recess to set a vertical position of the head restraint relative to the rod. Further, at least one of the recess and the locking portion is tapered. Tapering the recess and/or the locking portion ensures that there will be two opposed points of contact between the recess and the locking portion, thereby reducing, if not eliminating, BSR between the two elements.

Figure 1:
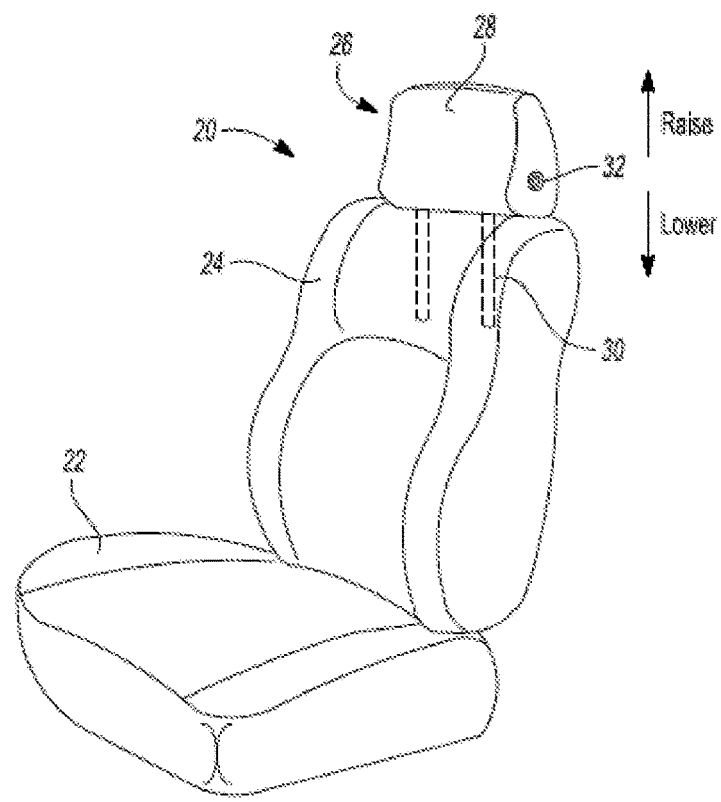
FIG. 1 is a perspective view of an example seat including an example headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and a rod 30. The rod 30 may be provided by a single, bent piece of material, or separately formed elements that have been connected together. In this example, the head restraint 28 is vertically adjustable relative to the seat back 24 along the rod 30 in a "raise" direction and a "lower" direction. In this example, the head restraint 28 includes a push button 32 which, when depressed, allows adjustment of the head restraint. While a push button 32 is discussed herein, other activation devices come within the scope of this disclosure.

The "raise" and "lower" directions are labeled in FIG. 1 for ease of reference. However, the terms "raise" and "lower" are used for purposes of explanation only and should not be otherwise considered limiting. Similarly, the term "vertical" should not be considered limiting. In this disclosure, the terms "raise" and "lower" are used with reference to the position of the head restraint 28 relative to the seat back 24, and the term "vertical" is used relative to the normal, upright position of the seat 20.

Figure 2:
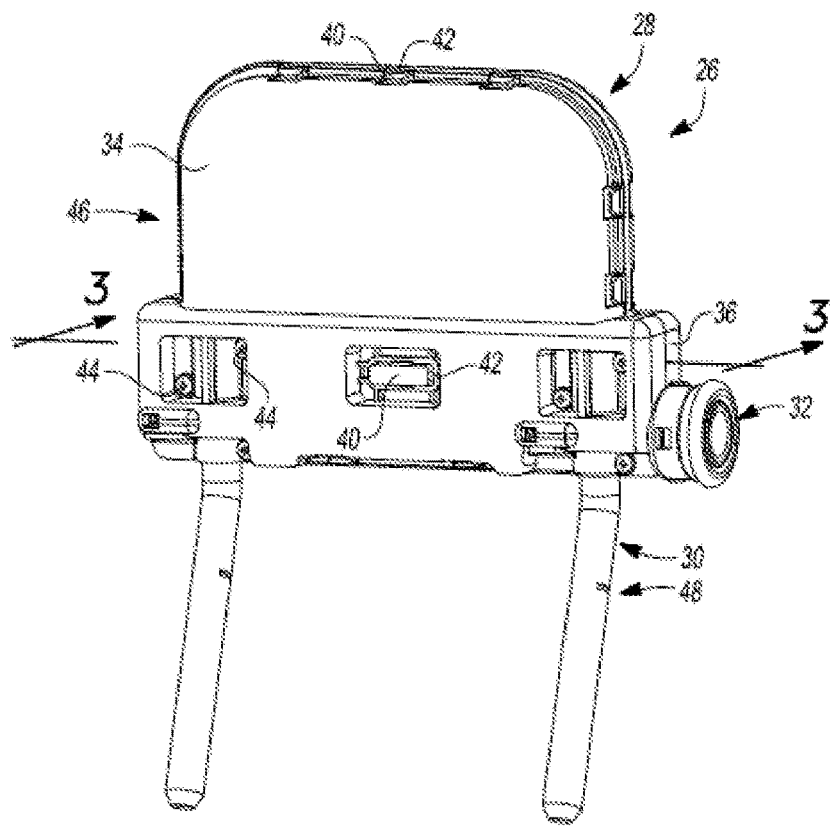
FIG. 2 is a perspective view of an example headrest assembly.

FIG. 2 illustrates the headrest assembly 26 without any padding or covering attached to the head restraint 28. The headrest assembly 26 in this example includes a first cover 34 and a second cover 36. The first and second covers 34, 36 are connected together and define an interior space 38 (FIG. 3) between the covers 34, 36. The first cover 34 in this example is a front cover configured to face the rear of an occupant's head and/or neck when in use. The second cover 36 is a rear cover. The first and second covers 34, 36 are connected together by a plurality of latches 40, which project from the second cover 36 and are received in corresponding recesses 42 of the first cover 34. Further, there are a plurality of fasteners 44 connecting the first and second covers 34, 36.

While not illustrated in FIG. 2, the first and second covers 34, 36 are configured to support a cushion and an encasement. In FIG. 1 the head restraint 28 supports a cushion, which may include foam encased in fabric, such as leather or cloth.

The rod 30 includes an upper portion 46 surrounded by the first and second covers 34, 36 and received in the interior space 38, and a lower portion 48 configured to couple to the seat back 24. The rod 30 is generally configured to remain fixed relative to the seat back 24. The head restraint 28 is configured to selectively move along the rod 30 in the "raise" and "lower" directions when the push button 32 is depressed. The push button 32 is supported by at least one of the first and second covers 34, 36.

Figure 3:
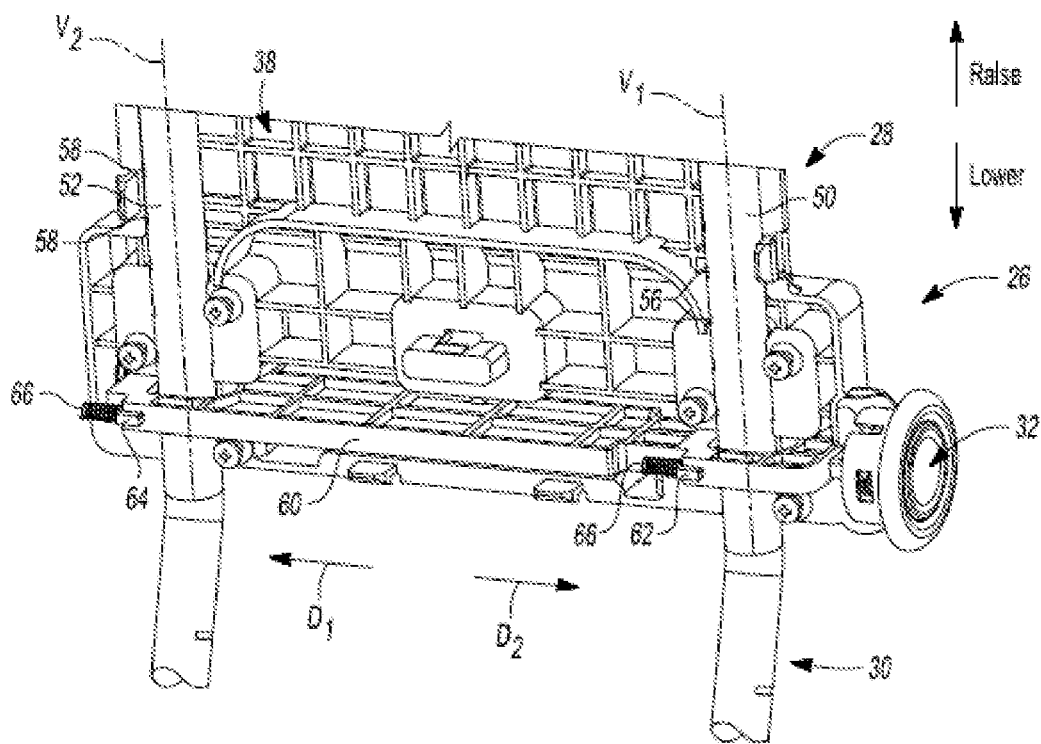
FIG. 3 is a cross-sectional view of the example headrest assembly taken along line 3-3 from FIG. 2.

FIG. 3 is a cross-sectional view taken along line 3-3 of FIG. 2 and illustrates the detail of the interior space 38. FIG. 3 illustrates, in particular, an example arrangement providing selective adjustment of the head restraint 28 relative to the rod 30.

As shown in FIG. 3, the rod 30 includes a first vertical portion 50 and a second vertical portion 52. The first and second vertical portions 50, 52 are arranged generally along first and second vertical axes $V_1$, $V_2$, and are spaced-apart by a horizontal portion of the rod 30, which is not shown. The first and second vertical portions 50, 52 each have a plurality of recesses 56, 58. The recesses 56, 58 in this example are in the form of notches or slots formed on an outer surface of the first and second vertical portions 50, 52, respectively.

In this example, the head restraint 28 includes a pushing plate 60 having a first locking portion 62 and a second locking portion 64. In this example, the pushing plate 60 is a single structure including, or supporting, the first and second locking portions 62, 64. In one example, the first and second locking portions 62, 64 are separate structures connected to the pushing plate 60, and in another example the first and second locking portions 62, 64 are integrally formed with the pushing plate 60. In one particular example, the pushing plate 60 is formed of a single piece of plastic material, and the first and second locking portions are provided by pieces of metallic material, which may be overmolded into the overall pushing plate 60 structure. The first and second locking portions 62, 64 are configured to selectively engage the recesses 56, 58 of the first and second vertical portions 50, 52, respectively, to allow one to adjust and set a vertical position of the head restraint 28.

In this example, the pushing plate 60 is configured to move in a horizontal direction between an engaged position and a disengaged position under force of the push button 32. In FIG. 2, the directions $D_1$, $D_2$ opposite horizontal directions and are substantially perpendicular to the "raise" and "lower" directions and the axes $V_1$, $V_2$.

In this example, the pushing plate 60 is biased in the direction $D_2$ toward the engaged position by a plurality of biasing elements 66. In the engaged position, the first and second locking portions 62, 64 are received in the recesses 56, 58 under the force of the biasing elements 66, which urge the pushing plate 60 in the direction $D_2$, such that vertical adjustment of the head restraint 28 is prevented. When the push button 32 is depressed such that the force of the biasing elements 66 is overcome, the pushing plate 60 moves in the direction $D_1$ to the disengaged position. In this position, the locking portions 62, 64 are not received in the recesses 56, 58, which allows vertical adjustment of the head restraint 28 in the "raise" and "lower" directions. In order to set a vertical position of the head restraint 28, the user releases the push button 32, and the biasing elements 66 urge the pushing plate 60 in the direction $D_2$ back to the engaged position.

Figure 4:
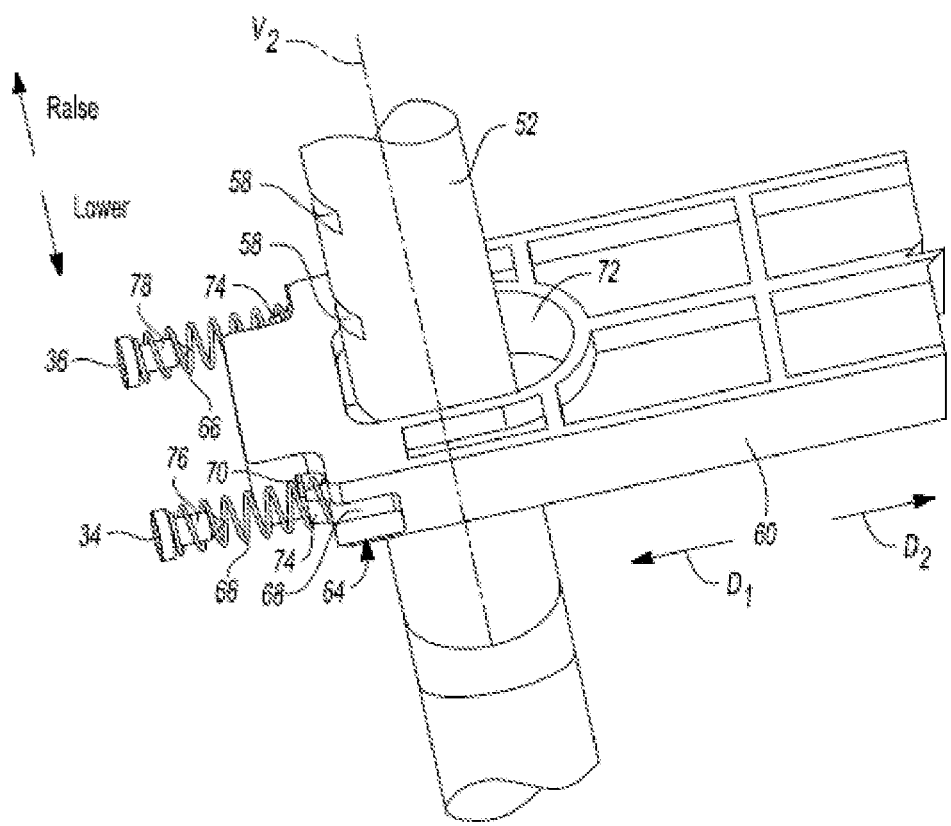
FIG. 4 is a close-up view of an example locking arrangement.

FIG. 4 illustrates an example locking arrangement in detail. FIG. 4 illustrates some of the detail of the second locking portion 64 and the second vertical portion 52, but it should be understood that this arrangement also applies to the first locking portion 62 and the first vertical portion 50. In FIG. 4, the second locking portion 64 of the pushing plate 60 includes a plate 68. In one example, the plate 68 is a metallic plate and is formed separately from the pushing plate 60, which may be formed of plastic in one example. It should be understood, however, that this disclosure is not limited to any particular material types.

In this example, the plate 68 is received in a slot 70 of the pushing plate 60. The pushing plate 60 further includes a rod opening 72 sized to allow the plate 68 to selectively engage the recesses 58 and to allow movement of the pushing plate 60 in the directions $D_1$, $D_2$.

Further, in this example, the plate 68 includes a plurality of projections 74 for supporting an end of a biasing element 66. In this example, the biasing element 66 is a coil spring received over the projection 74. The biasing elements are also received, at an opposite end, over projections 76, 78 formed in the first and second covers 34, 36 respectively. While FIG. 4 illustrates one example locking arrangement, other arrangements come within the scope of this disclosure.

Figure 5:
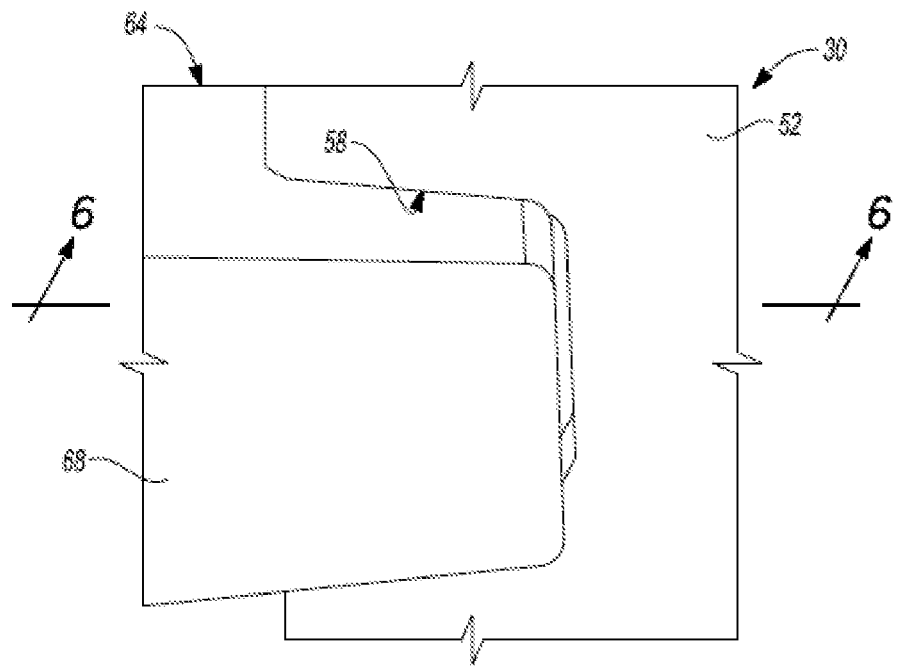
FIG. 5 is an even closer view of the example locking arrangement, and in particular illustrates a locking portion (i.e., plate) within a recess (i.e., notch).
Figure 6:
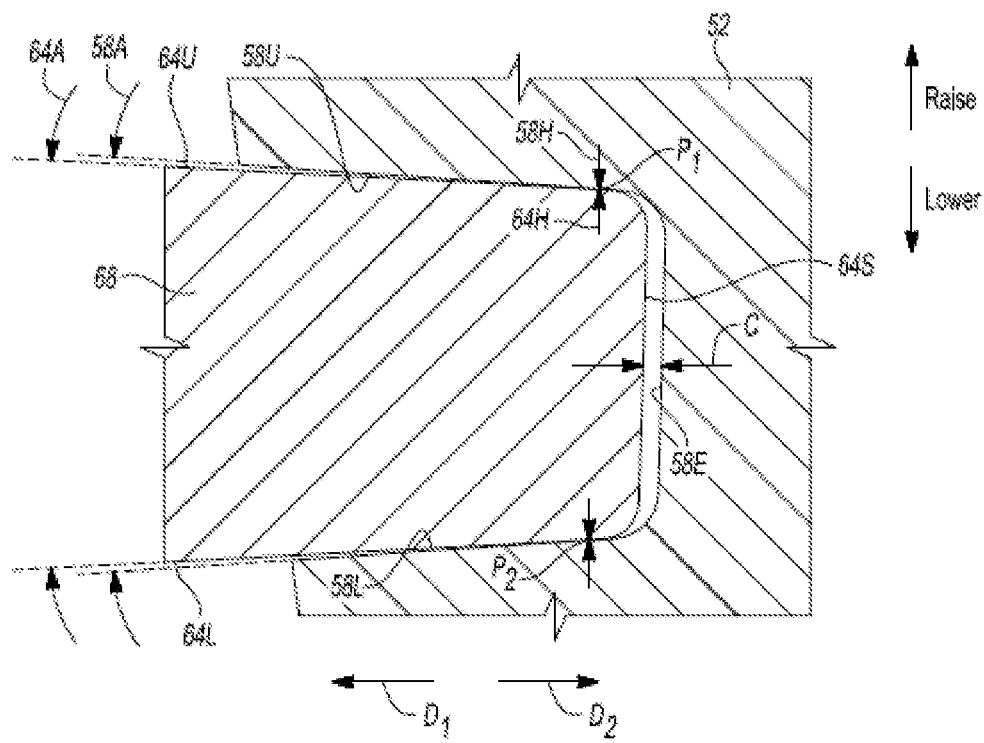
FIG. 6 is a cross-sectional view taken along line 6-6 from FIG. 5.

FIGS. 5 and 6 illustrate further detail of an example locking arrangement between a locking portion (i.e., plate) of the head restraint 28 and a recess (i.e., notch) of the rod 30. In particular, FIGS. 5 and 6 illustrate the plate 68 of the second locking portion 64 within the recess 58 of the second vertical portion 52 of the rod 30. In FIGS. 5 and 6, the pushing plate 60 is in the engaged position. Specifically, in FIGS. 5 and 6, the second locking portion 64 is urged into the engaged position by way of the biasing elements 66.

While the second locking portion 64 is shown relative to the second vertical portion 52, it should be understood that the first locking portion 62 and the first vertical portion 50 may be arranged similarly. Further, while only one recess 58 is shown, it should be understood that each of the recesses 56, 58 may be arranged as shown in FIGS. 5 and 6.

The locking arrangement shown in FIGS. 5 and 6 reduces, if not eliminates, BSR that may be caused between the second locking portion 64 and the second vertical portion 52. In the example locking arrangement, at least one of the recess 58 and the second locking portion 64 is tapered. In this way, the locking arrangement maintains two opposed points of contact between the recess 58 and the second locking portion 64, which prevents unwanted vertical movement between the parts.

In a particular embodiment of this disclosure, both the recess 58 and the locking portion 64 are tapered. With reference to the recess 58, the recess 58 is provided by a notch including an upper surface 58U, a lower surface 58L, and an end surface 58E extending vertically between the upper and lower surfaces 58U, 58L. The recess 58 is tapered such that a height 58H of the recess 58 between the upper and lower surfaces 58U, 58L gradually reduces moving away from the outside of the rod 30 and toward the end surface 58E. In other words, the height 58H gradually reduces moving in the direction $D_2$. In a particular example, the upper and lower surfaces 58U, 58L lie in substantially flat planes which are inclined relative to one another by an angle 58A, which will be discussed below. In a further example, neither the upper surface 58U nor the lower surface 58L lies in a plane parallel to the horizontal directions $D_1$, $D_2$.

With reference to the second locking portion 64, the second locking portion 64 is provided by a plate 68 including an upper surface 64U, a lower surface 64L, and a side surface 64S extending vertically between the upper and lower surfaces 64U, 64L. The second locking portion 64 is tapered such that a height 64H between the upper and lower surfaces 64U, 64L gradually reduces moving in the direction $D_2$ toward the side surface 64S. In a particular example, the upper and lower surfaces 64U, 64L lie in substantially flat planes which are inclined relative to one another by an angle 64A. In a further example, the upper and lower surfaces 64U, 64L lie in planes that are inclined relative to the horizontal directions.

In one example, the angle 64A is less than the angle 58A. In other words, the taper of the recess 58, which is defined by angle 58A, is greater than the taper of the second locking portion 64, which is defined by the angle 64A.

In this disclosure, the recess 58 and the second locking portion 64 are sized and shaped such that the heights 58H, 64H of the recess 58 and the second locking portion 64 converge and provide two points of contact on opposite sides of the second locking portion 64. In particular, a first point of contact $P_1$ is provided between the upper surfaces 58U, 64U, and a second point of contact $P_2$ is provided between the lower surfaces 58L, 64L. The recess 58 and the second locking portion 64 are also sized and shaped such that the points of contact $P_1$, $P_2$ are established before the side surface 64S contacts the end surface 58E. In other words, the recess 58 and the second locking portion 64 are sized and shaped such that, when the second locking portion 64 is within the recess 58, there are two points of contact $P_1$, $P_2$ and there is a clearance C between the side surface 64S and the end surface 58E.

This exemplary arrangement shown in FIGS. 5 and 6 reduces, if not eliminates, BSR while allowing for acceptable manufacturing tolerances for the second locking portion 64 and the recess 58. In other words, even if the recess 58 and the second locking portion 64 are machined near the outer limits of their established tolerances, BSR will still be prevented.

It should be understood that terms such as "upper," "lower," "raise," "vertical," and "horizontal" are used above with reference to the normal, upright position of a car seat in a vehicle. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
   a rod configured to connect the headrest assembly to a seat back, the rod including a recess; and
   a head restraint having a locking portion configured to selectively engage the recess to set a vertical position of the head restraint, wherein at least one of the recess and the locking portion is tapered,
   wherein both the recess and the locking portion are tapered,
   wherein, when the locking portion is within the recess, there are two points of contact between the locking portion and the rod, and
   wherein, when the locking portion is within the recess, the locking portion is spaced-apart from an end of the recess.

2. The headrest assembly as recited in claim 1, wherein the recess is tapered such that a dimension of the recess is reduced moving away from the outside of the rod.

3. The headrest assembly as recited in claim 1, wherein the locking portion is a plate tapered such a dimension of the plate is reduced moving toward the recess.

4. The headrest assembly as recited in claim 1, wherein the taper of the recess is greater than a taper of the locking portion.

5. The headrest assembly as recited in claim 1, wherein opposed surfaces of the locking portion are in contact with opposed surfaces of the recess.

6. The headrest assembly as recited in claim 1, wherein:
the rod includes first and second vertical sections,
each of the first and second vertical sections includes a plurality of recesses,
the locking portion is a first locking portion configured to selectively engage the recesses of the first vertical section, and
the head restraint includes a second locking portion configured selectively engage the recesses of the second vertical section.

7. The headrest assembly as recited in claim 1, wherein:
the head restraint includes a pushing plate, and
the locking portion is moveable with the pushing plate.

8. The headrest assembly as recited in claim 7, wherein the locking portion is provided by a metal plate mounted to the pushing plate.

9. The headrest assembly as recited in claim 7, wherein the head restraint includes a push button configured to move the pushing plate when depressed.

10. The headrest assembly as recited in claim 9, wherein the pushing plate is moveable between an engaged position and a disengaged position by the push button.

11. The headrest assembly as recited in claim 1, wherein the head restraint includes a biasing member biasing the locking portion toward the recess.

12. The headrest assembly as recited in claim 1, wherein:
the head restraint includes a first cover and a second cover, and
the first cover and the second cover support a cushion and an encasement.

13. A seat for a motor vehicle, comprising:
a seat back; and
a headrest assembly, comprising:
a rod configured to connect the headrest assembly to a seat back, the rod including a recess;
a head restraint having a locking portion configured to selectively engage the recess to set a vertical position of the head restraint, wherein at least one of the recess and the locking portion is tapered,
wherein, when the locking portion is within the recess, there are two points of contact between the locking portion and the rod and the locking portion is spaced-apart from an end of the recess,
wherein opposed surfaces of the locking portion are in contact with opposed surfaces of the recess.

14. The seat as recited in claim 13, wherein:
the recess is tapered such that a dimension of the recess is reduced moving away from the outside of the rod, and
the locking portion is a plate tapered such a dimension of the plate is reduced moving toward the recess.

15. The seat as recited in claim 14, wherein the taper of the recess is greater than a taper of the locking portion.

* * * * *